United States Patent Office 2,816,889
Patented Dec. 17, 1957

2,816,889
PROCESS FOR THE PREPARATION OF HIGH GEL CARBOXYALKYLATED CELLULOSE ETHERS

Wiley M. Branan, Pennsgrove, N. J., assignor to E. I. du Pont de Nemours and Company, Wilmington, Del., a corporation of Delaware No Drawing. Application October 1, 1954,
Serial No. 459,828

6 Claims. (Cl. 260—231)

This invention relates to a novel process for the preparation of the alkali metal salts of carboxyalkylated cellulose ethers which are partially, but incompletely, soluble in water. More particularly, this invention pertains to the preparation of such ethers, a significant proportion of which assumes the form of an insoluble gel upon dispersion in water.

There are three reactive hydroxyl groups susceptible of etherification in any single anhydroglucose unit of cellulose. A cellulose polymer which is etherified to the maximum possible extent is thus said to have a degree of etherification of 3.0. This represents the situation where every hydrogen in each reactable hydroxyl group of each anhydroglucose unit of cellulose has been replaced by an ether group. In the preparation of cellulose ethers certain terms have achieved a definite meaning in the art. Throughout this specification the terms have the following connotation:

Degree of etherification (D. E.): The actual degree of substitution obtained as determined by analysis of the product, i. e. the average number of etherified hydroxyl groups per anhydroglucose unit of the cellulose molecule. Theoretical degree of etherification (T. D. E.): The degree of substitution achieved if all of the etherifying agent is utilized in the reaction, i. e. the number of moles of etherifying agent added to the reaction mixture per anhydroglucose unit of cellulose.

The carboxyalklated ethers of cellulose and their salts have been known for many years and have been used in connection with a variety of industrial processes and reactions. Cellulose itself is not appreciably soluble in water. Cellulose which has been etherified to a very low degree, i. e. carboxyalkylated cellulose having a D. E. of 0.3 or lower, is so like the parent cellulose that it, too, is generally completely insoluble in water. For the most part, above a D. E. of about 0.3, solubility increases with increasing D. E. until at a D. E. of about 0.65 the cellulose ether is completely water-soluble. Cellulose ethers having a D. E. between 0.3 and 0.65 are partially, but incompletely, soluble in water, the insoluble portion being in the form of a gel.

Prior art processes for the preparation of cellulose ethers in the D. E. range of from 0.3 to 0.65 have primarily been directed toward the elimination of the aforementioned gel and the enhancement of the solubility properties of the ether. Solubility is an extremely significant property where industrial reactants are concerned and frequently governs the selection of particular compounds as starting materials or intermediaries in a commercial process. Thus, in pursuit of a more completely soluble product numerous methods have been suggested in the prior art for minimizing or eliminating the formation of insoluble gel in these carboxyalkylated cellulose ethers.

However, recent developments in the cellulose arts indicate that the carboxyalkylated cellulose ethers having appreciable insoluble gel content are susceptible of special industrial applications in situations where the wholly soluble ethers are unsuitable. For example, U. S. Patent No. 2,626,214, issued June 14, 1949 to Fay H. Osborne, teaches a method for preparing a synthetic web or membrane of the type used in the manufacture of tea-bags, utilizing a carboxymethylcellulose some portions of which are completely soluble and other portions of which form tiny gel particles upon dispersion in water.

Since the prior art methods of preparing carboxyalkylated cellulose ethers are primarily directed towards minimizing gel content in the product, as noted above, there is not available a process which tends to consistently yield a product having a high gel content.

It is accordingly an object of the present invention to provide a process for the preparation of carboxyalkylated cellulose ethers, a significant portion of which is in the form of an insoluble gel. It is a further object of the present invention to provide such a process which is reliable, economical and yields a product of superior quality. Other and additional objects will become apparent from a consideration of the following.

It is well-known that two or more carboxyalkylated cellulose ethers having equal degrees of substitution may contain markedly different percentages of insoluble gel. This variation is believed to be attributable in many instances to the uniformity of the substitution (or lack thereof) as distinguished from the degree of substitution. Generally, the more uniform the substitution along the length of the cellulose polymer, the more soluble the ether is likely to be. Conversely, the less uniform the substitution, the greater the percentage of insoluble gel when the ether is dispersed in water. A process for the preparation of cellulose ethers which may be relied upon consistently to yield a product having a high gel content will accordingly be one which tends to etherify the parent cellulose in a non-uniform manner. I have found that this may be accomplished by utilizing as a starting material cellulose in the form of a shredded wood pulp, the fibers of which have an average fiber length of at least about 0.3 millimeter, and by etherifying this cellulose in a reaction medium having a relatively low liquid-to-cellulose ratio. By using a bulky, voluminous, fibrillated wood pulp and by maintaining a low liquid-to-cellulose ratio throughout the etherification process, contact between the reactants will be poor, substitution of the cellulose will not be uniform, and the resulting cellulose ether will contain a high proportion of insoluble gel.

The following examples are cited as illustrative of the invention and are not intended as limiting in any manner.

Example 1

91 pounds of 50% aqueous sodium hydroxide was dissolved in 68¼ pounds of water in an agitator-type mixer provided with a circulating water jacket. This solution was cooled to 30° C. and 108 pounds of shredded wood pulp containing about 5% water was added. The fibers of the wood pulp had an average fiber length of about 0.3 mm. The ratio of water to dry cellulose was 1.1 to 1. The mixture was then agitated for one hour. Two 24¾ pound portions of monochloroacetic acid were then added to the slurry in succession with mixing periods of fifteen minutes following each addition (T. D. E.=0.83). The water in the jacket was heated to 80° C., and mixing was continued for a period of ninety minutes at this temperature. The cellulose ether product which formed was discharged into cardboard cartons, dried in hot air, and pulverized. On analysis, the product (sodium carboxymethyl-cellulose) exhibited the following properties:

Moisture content _____ percent__ 1.0
Actual degree of etherification _____ 0.47
Purity _____ percent__ 69.6
pH (1% water solution) _____ 11.6
Gel retained on 325-mesh screen (based on weight
  of total dry solids) _____ percent__ 13.9

Gel content was determined by the following method: The carboxymethyl cellulose was dispersed in a quantity of water sufficient to produce a mixture having a very low viscosity and then screened through a 325-mesh screen (U. S. Standard Screen Scale) with the aid of a stream of water. The screen containing the particles of carboxymethyl cellulose gel was immersed in 190-proof ethanol and the gel was washed off the screen with ethanol, dried, and weighed.

*Example 2*

The procedure of Example 1 was repeated varying the ingredient proportions as follows:

| | | |
|---|---|---|
| Water | pounds | 33½ |
| 50% sodium hydroxide solution | do | 55½ |
| Shredded wood pulp | do | 108 |
| Chloroacetic acid (total) | do | 30 |
| Liquid: dry cellulose | | 0.6:1 |
| T. D. E. | | 0.50 |

On analysis, the resulting cellulose ether (sodium carboxymethylcellulose) gave the following values:

| | | |
|---|---|---|
| Moisture content | percent | 1.0 |
| Actual degree of etherification | | 0.42 |
| Purity | percent | 79.1 |
| pH (1% water solution) | | 10.0 |
| Gel retained on 325-mesh screen (based on weight of total dry solids) | percent | 30.7 |

*Example 3*

The procedure of Example 1 was repeated varying the ingredient proportions as follows:

| | | |
|---|---|---|
| Water | pounds | 84½ |
| 50% sodium hydroxide solution | do | 91 |
| Shredded wood pulp | do | 108 |
| Chloroacetic acid (total) | do | 49½ |
| Liquid: dry cellulose | | 1.3:1 |
| T. D. E. | | 0.83 |

On analysis, the resulting cellulose ether (sodium carboxymethylcellulose) gave the following values:

| | | |
|---|---|---|
| Moisture content | percent | 1.0 |
| Actual degree of etherification | | 0.47 |
| Purity | percent | 68.4 |
| pH (1% water solution) | | 11.2 |
| Gel retained on 325-mesh screen (based on weight of total dry solids) | percent | 25.9 |

*Example 4*

The procedure of Example 1 was repeated varying the ingredient proportions as follows:

| | | |
|---|---|---|
| Water | pounds | 48½ |
| 50% sodium hydroxide solution | do | 67½ |
| Shredded wood pulp | do | 108 |
| Chloroacetic acid | do | 36 |
| Liquid: dry cellulose | | 0.8:1 |
| T. D. E. | | 0.60 |

On analysis, the resulting cellulose ether (sodium carboxymethylcellulose) gave the following values:

| | | |
|---|---|---|
| Moisture content | percent | 1.3 |
| Actual degree of etherification | | 0.46 |
| Purity | percent | 75.0 |
| pH (1% water solution) | | 10.8 |
| Gel retained on 325-mesh screen (based on weight of total dry solids) | percent | 27.2 |

In the carboxyalkalation process described above, the halogenated fatty acids (or alkali metal salts thereof) may be used as the etherifying agent, the particular acid used in any instance depending upon the ether group desired to be introduced into the cellulose. Thus, in the preparation of carboxymethyl cellulose, one of the most common of the cellulose ethers, either monochloroacetic acid or an alkali metal salt thereof may be used as the etherifying agent. If carboxyethyl cellulose is desired, chloropropionic acid may be used, and so on.

The process outlined above may be relied upon to yield a cellulose ether having a significant quantity of insoluble gel so long as the product is within that range of substitution in which it may exist partly in a soluble form and partly in the insoluble form, i. e., a degree of substitution from about 0.3 to about 0.65. The liquid-to-cellulose ratio must be maintained at a low level. For best results, it should not be allowed to rise higher than about 1.3 parts of water by weight per part of dry cellulose but ratios as high as 2:1 are operable. The theoretical degree of etherification, i. e., the number of moles of etherifying agent added to the reaction mixture per anhydroglucose unit of cellulose, should be maintained between about 0.50 and 0.90.

Having thus described my invention, I intend to be limited only by the following claims.

I claim:

1. A process for the preparation of a partially, but incompletely, water-soluble alkali metal salt of a cellulose ether selected from the class consisting of carboxymethyl cellulose and carboxyethyl cellulose, the non-soluble proportion of which exists as an insoluble gel in the presence of water, including the essential step of mixing cellulose in the form of shredded, fibrillated wood pulp with about 0.5 to 0.9 mole per anhydroglucose unit of cellulose of an etherifying agent selected from the group consisting of the short-chain, mono-chlorinated, mono-carboxylic, saturated fatty acids and the alkali metal salts thereof in the presence of an aqueous alkali metal hydroxide and in a reaction medium having a liquid to cellulose ratio not larger than about 2:1, the fibers of said wood pulp having an average fiber length of at least about 0.3 mm.

2. A process as in claim 1 wherein the etherifying agent is monochloroacetic acid.

3. A process as in claim 1 wherein the etherifying agent is sodium monochloroacetate.

4. A process as in claim 1 wherein the alkali metal hydroxide is sodium hydroxide.

5. A process for the preparation of a partially, but incompletely, water-soluble sodium carboxymethyl cellulose ether, the non-soluble proportion of which exists as an insoluble gel in the presence of water, including the essential step of mixing cellulose in the form of shredded, fibrillated wood pulp with about 0.5 to about 0.9 mole per anhydroglucose unit of cellulose of a compound selected from the class consisting of monochloroacetic acid and the alkali metal salts thereof in the presence of an aqueous alkali metal hydroxide and in a reaction medium having a liquid to cellulose ratio not larger than about 2:1, the fibers of said wood pulp having an average fiber length of at least about 0.3 mm.

6. A process as in claim 5 wherein the alkali metal hydroxide is sodium hydroxide.

References Cited in the file of this patent

UNITED STATES PATENTS

| | | |
|---|---|---|
| 1,884,629 | Dreyfus | Oct. 25, 1932 |
| 2,236,545 | Maxwell et al. | Apr. 1, 1941 |
| 2,278,612 | Collings et al. | Apr. 7, 1942 |
| 2,524,024 | Swinehart et al. | Sept. 26, 1950 |

OTHER REFERENCES

"Cellulose and Cellulose Derivatives" by Ott, Interscience Publ. (1946); page 784 relied on.